United States Patent
O'Sullivan et al.

(10) Patent No.: US 9,819,635 B2
(45) Date of Patent: Nov. 14, 2017

(54) SYSTEM AND METHOD FOR MESSAGE STATUS DETERMINATION

(75) Inventors: Patrick Joseph O'Sullivan, Ballsbridge (IE); Edith Helen Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/361,673

(22) Filed: Jan. 30, 2012

(65) Prior Publication Data
US 2013/0198295 A1 Aug. 1, 2013

(51) Int. Cl.
*G06F 15/16* (2006.01)
*H04L 12/58* (2006.01)

(52) U.S. Cl.
CPC .................. H04L 51/34 (2013.01)

(58) Field of Classification Search
CPC ...................................... H04L 51/34
USPC ................................ 709/206, 224
See application file for complete search history.

(56) References Cited

U.S. PATENT DOCUMENTS

| | | | | |
|---|---|---|---|---|
| 7,389,347 | B2* | 6/2008 | Brodie et al. | 709/224 |
| 7,984,100 | B1* | 7/2011 | King et al. | 709/206 |
| 2004/0015601 | A1 | 1/2004 | Whitson | |
| 2005/0010799 | A1 | 1/2005 | Kelley et al. | |
| 2005/0044250 | A1* | 2/2005 | Gay et al. | 709/230 |
| 2005/0235057 | A1* | 10/2005 | Brodie et al. | 709/224 |
| 2008/0304421 | A1* | 12/2008 | Ramasubramanian | H04L 41/147 370/251 |
| 2009/0049141 | A1* | 2/2009 | Jones et al. | 709/206 |
| 2009/0112995 | A1 | 4/2009 | Addae et al. | |
| 2009/0187631 | A1* | 7/2009 | Su et al. | 709/206 |
| 2011/0231501 | A1* | 9/2011 | Swamidass | H04L 51/14 709/206 |
| 2012/0231770 | A1* | 9/2012 | Clarke et al. | 455/414.1 |

FOREIGN PATENT DOCUMENTS

KR 2001-0105114 11/2008

OTHER PUBLICATIONS

Anonymous, "[EMAIL] System, method and process for sorting email based on sender estimate of time-to-reply and reputation of same", http://www.ip.com/priorartdatabase.com/IPCOM000199134D, Aug. 26, 2010, 3 pages.
International Business Machines Corporation, "Content Security/Tracking, email", http//www.ip.com/pubview/IPCOM000021999D, Feb. 18, 2004, 5 pages.

* cited by examiner

Primary Examiner — Philip Chea
Assistant Examiner — Robert B McAdams
(74) Attorney, Agent, or Firm — Brian J. Colandreo, Esq.; Jeffrey T. Placker, Esq.; Holland & Knight LLP

(57) ABSTRACT

A method, computer program product, and computer system for processing a status request received from a requester concerning an electronic message addressed from a sender to a recipient. A probable route between the sender and the recipient for the electronic message is predicted. A message status for the electronic message is determined from one or more status indicators based at least in part upon the probable route.

21 Claims, 4 Drawing Sheets

SYSTEM AND METHOD FOR MESSAGE STATUS DETERMINATION

TECHNICAL FIELD

This disclosure relates to status determination systems and methods and, more particularly, to message status determination systems and methods.

BACKGROUND

The advent of the Internet has allowed for easy communication amongst varying groups of people around the world. Unfortunately, as use of the Internet became more popular, the individual devices connected to the Internet that effectuate the transmission of messages between users became more slow to respond to such requests.

Accordingly, e-mail messages that used to be quickly delivered through a comparably uncluttered Internet have become delayed due to the high load experienced by many devices on the Internet. Therefore, what used to be a comparative real-time transmission medium has unfortunately become burdened by its own success.

SUMMARY OF DISCLOSURE

In one implementation, a computer-implemented method includes processing a status request received from a requester concerning an electronic message addressed from a sender to a recipient. A probable route between the sender and the recipient for the electronic message is predicted. A message status for the electronic message is determined from one or more status indicators based at least in part upon the probable route.

One or more of the following features may be included. The requester may be provided with the message status concerning the electronic message. The requestor may be one of the sender and the recipient. The probable route may pass through, in whole or in part, one or more of: a fully queryable computer network; a partially queryable computer network; and a non-queryable computer network.

Determining a message status may include obtaining more robust information concerning one or more devices included within the fully queryable computer network. Determining a message status may include obtaining less robust information concerning one or more devices included within the partially queryable computer network. Determining a message status may include obtaining route trace information concerning one or more devices included within the non-queryable computer network. The one or more status indicators may be chosen from a group consisting of: distance travelled; distance remaining; time elapsed; time remaining; hops completed; hops remaining; time initiated; estimated time of completion; failure indicators; and delay indicators.

In another implementation, a computer program product resides on a computer readable medium that has a plurality of instructions stored on it. When executed by a processor, the instructions cause the processor to perform operations including processing a status request received from a requester concerning an electronic message addressed from a sender to a recipient. A probable route between the sender and the recipient for the electronic message is predicted. A message status for the electronic message is determined from one or more status indicators based at least in part upon the probable route.

One or more of the following features may be included. The requester may be provided with the message status concerning the electronic message. The requestor may be one of the sender and the recipient. The probable route may pass through, in whole or in part, one or more of: a fully queryable computer network; a partially queryable computer network; and a non-queryable computer network.

Determining a message status may include obtaining more robust information concerning one or more devices included within the fully queryable computer network. Determining a message status may include obtaining less robust information concerning one or more devices included within the partially queryable computer network. Determining a message status may include obtaining route trace information concerning one or more devices included within the non-queryable computer network. The one or more status indicators may be chosen from a group consisting of: distance travelled; distance remaining; time elapsed; time remaining; hops completed; hops remaining; time initiated; estimated time of completion; failure indicators; and delay indicators.

In another implementation, a computing system includes a processor and memory configured to perform operations including processing a status request received from a requester concerning an electronic message addressed from a sender to a recipient. A probable route between the sender and the recipient for the electronic message is predicted. A message status for the electronic message is determined from one or more status indicators based at least in part upon the probable route.

One or more of the following features may be included. The requester may be provided with the message status concerning the electronic message. The requestor may be one of the sender and the recipient. The probable route may pass through, in whole or in part, one or more of: a fully queryable computer network; a partially queryable computer network; and a non-queryable computer network.

Determining a message status may include obtaining more robust information concerning one or more devices included within the fully queryable computer network. Determining a message status may include obtaining less robust information concerning one or more devices included within the partially queryable computer network. Determining a message status may include obtaining route trace information concerning one or more devices included within the non-queryable computer network. The one or more status indicators may be chosen from a group consisting of: distance travelled; distance remaining; time elapsed; time remaining; hops completed; hops remaining; time initiated; estimated time of completion; failure indicators; and delay indicators.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
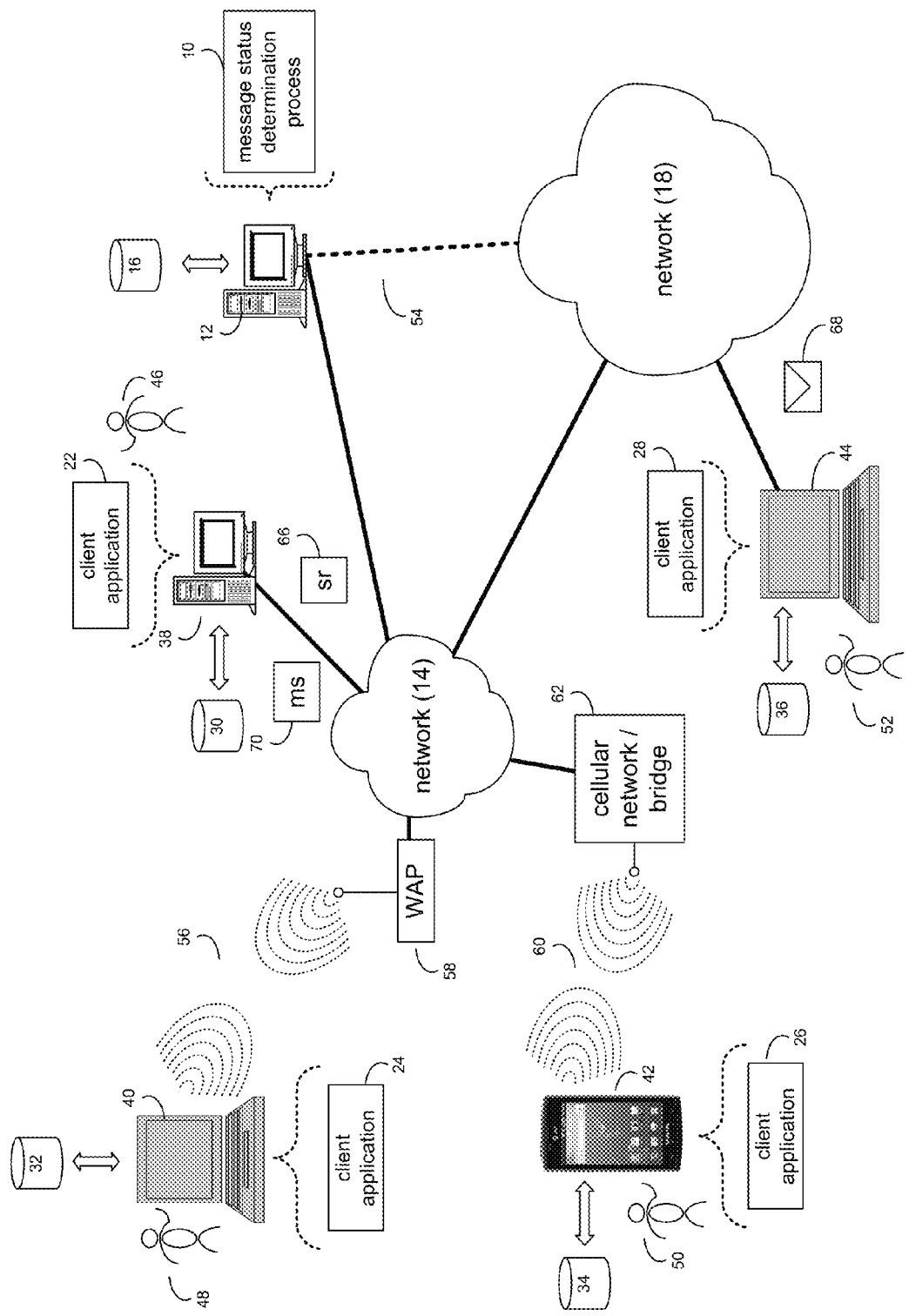
FIG. 1 is a diagrammatic view of a message status determination process coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown message status determination process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, message status determination process 10 may process a status request received from a requester concerning an electronic message addressed from a sender to a recipient. A probable route between the sender and the recipient for the electronic message may be predicted. A message status for the electronic message may be determined from one or more status indicators based at least in part upon the probable route.

The instruction sets and subroutines of message status determination process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Message status determination process 10 may be accessed via client applications 22, 24, 26, 28. Examples of client applications 22, 24, 26, 28 may include but are not limited to a standard web browser, a customized web browser, an email client application, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a tablet computer (not shown), and a dedicated network device (not shown).

One or more of client applications 22, 24, 26, 28 may be configured to effectuate some or all of the functionality of message status determination process 10. Accordingly, message status determination process 10 may be a purely server-side application, a purely client-side application, or a hybrid server-side/client-side application that is cooperatively executed by one or more of client applications 22, 24, 26, 28 and message status determination process 10.

Users 46, 48, 50, 52 may access computer 12 and message status determination process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

Figure 2:
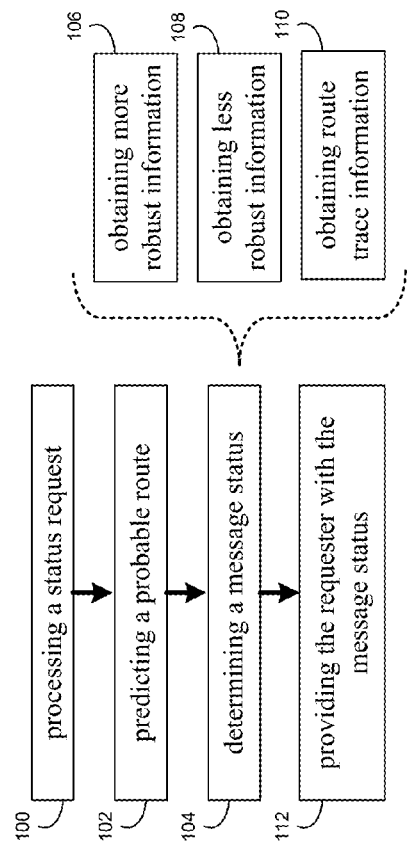
FIG. 2 is a flowchart of the message status determination process of FIG. 1.
Figure 3:
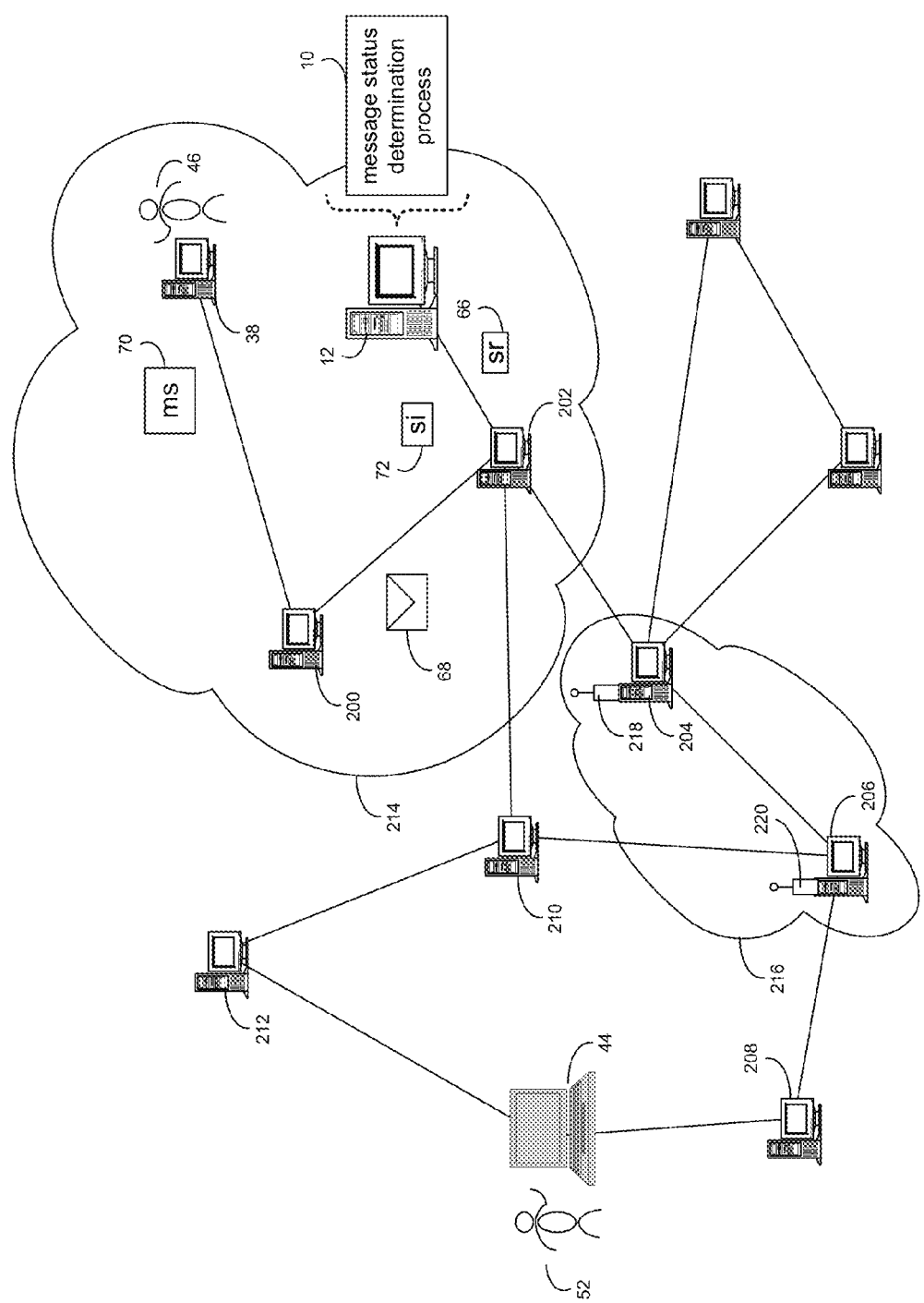
FIG. 3 is a diagrammatic view of a network to be analyzed by the message status determination process of FIG. 1.
Figure 4:
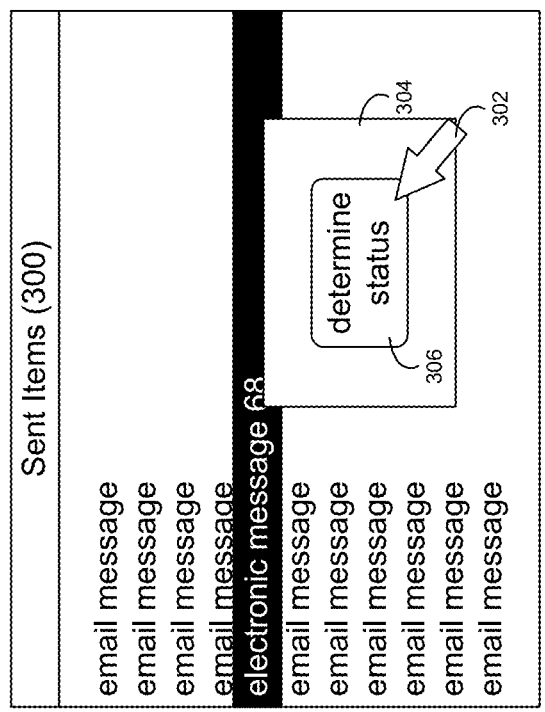

The Message Status Determination Process:

As discussed above and referring also to FIGS. 2-4, message status determination process 10 may process 100 status request 66 received from requester (e.g., user 46) concerning electronic message 68 addressed from a sender (e.g., user 46) to a recipient (e.g., user 52).

For example, assume that user 46 wishes to send an e-mail message to user 52 concerning e.g. an article that they read about the 2011 World Series. User 46 may compose electronic message 68, and address and send the same to user 52. Assume further that user 46 is aware that the transmission of e-mail messages have been delayed recently due to high network traffic between user 46 and user 52.

Therefore, user 46 may wish to generate status request 66 so that user 46 may obtain message status report 70 concerning electronic message 68. Accordingly, user 46 may select electronic message 68 from e.g. within their sent items box 300. For example, user 46 may select message 68 from within their sent items box 300 of their email system using on-screen pointer 302 that may be controllable by an electronic pointing device (e.g. a mouse, not shown) that is controllable by user 46. Once electronic message 68 is selected by user 46, user 46 may "right click" on electronic message 68, resulting in the rendering of pop-up menu 304. Selectable options included on pop-up menu 304 may include but are not limited to "determine status" option 306.

Figure 5:
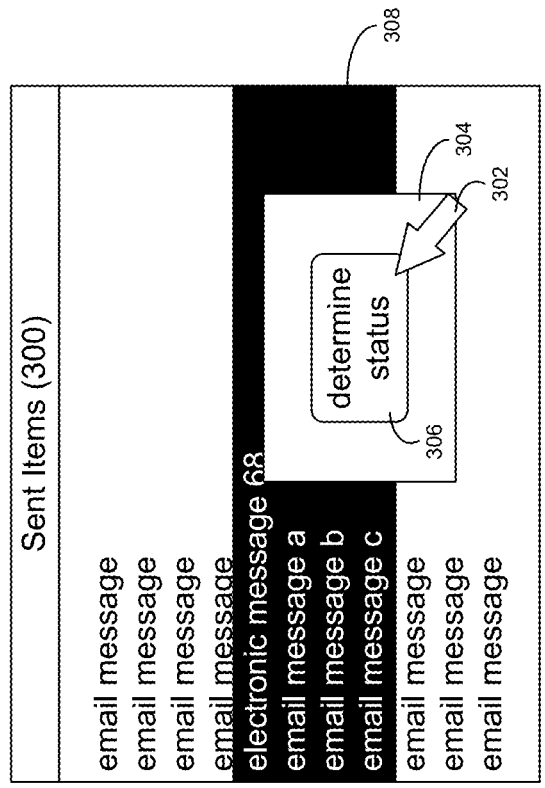
FIGS. 4-5 are diagrammatic views of display screens rendered by the message status determination process of FIG. 1

Once "determines status" option 306 is selected by user 46, status request 66 may be generated, which as discussed above may be processed 100 by message status determination process 10. Additionally and referring also to FIG. 5, message status determination process 10 may be configured to allow user 46 to select a plurality of messages (as represented by message group 308) and then select "determine status" option 306, so that status request 66 may be generated for message group 308, which as discussed above may be processed 100 by message status determination process 10.

While the system is described above as user 46 being the generator of status request 66, this is for illustrative purposes only and is not intended to be a limitation of this disclosure. For example, assuming that a third party has the appropriate rights delegated by user 46 and/or user 52, a third party (e.g. user 48) may be the requester (e.g. the person that generated status request 66. Accordingly, while the requestor may be one of the sender (e.g. user 46) and the recipient (e.g. user 52), this is merely for illustrative purposes only, as a third-party may be the requester (as discussed above).

Status request 66 may be configured to include whatever information is required to adequately identify electronic message 68. For example, information included within status request 66 may include but is not limited to: a sender's name; a sender's e-mail address; a recipient's name; a recipient's e-mail address; a subject identifier; a message body identifier; a unique e-mail message identifier; an e-mail size indicator; a time sent indicator; and a computer identifier concerning the computer on which electronic message 68 was composed (e.g. personal computer 38).

When status determination process 10 processes 100 status request 66, status determination process 10 may predict 102 a probable route between the sender (e.g., user 46) and the recipient (e.g., user 52) for electronic message 68.

Referring again to FIG. 3, there are many communication pathways between user 46 and user 52. For example, a first pass (i.e. Path A) may transmit electronic message 68 from computer 38, to computer 200, to computer 202, to computer 204, to computer 206, to computer 208, and finally to computer 44. Alternatively, a second path (i.e. Path B) may result in electronic message 68 being transferred from computer 38, to computer 200, to computer 202, to computer 204, to computer 206, to computer 210, to computer 212, and finally to computer 44. Alternatively still, a third path (i.e. Path C) may result in electronic message 68 being transferred from computer 38, to computer 200, to computer 202, to computer 210, to computer 212, and finally to computer 44. While other pathways may be available between user 46 and user 52, this list is for illustrative purposes only and is not intended to be an all-inclusive list of possible pathways.

While three possible pathways are described above (namely Path A, Path B, and Path C), each of these pathways may not be equally desirable with respect to routing electronic message 68 from user 46 to user 52. As discussed above, the various computing devices shown in FIG. 1 may be interconnected via one or more networks. Additionally, all networks are not equal concerning the ability of a requester to obtain status information from the various devices included in these networks. Accordingly and for illustrative purposes, the various networks may be grouped into one of three varieties, namely: a) fully queryable computer networks, b) partially queryable computer networks, and c) non-queryable computer networks.

Fully Queryable Computer Networks:

An example of a fully queryable computer network (e.g., fully queryable computer network 214) may include but is not limited to a closed network that is operated by an organization (e.g. a company or an educational institution), These networks (e.g., fully queryable computer network 214) tend to include network devices (e.g. computer 200, computer 202) that are highly accessible and highly controllable by the administrators of fully queryable computer network 214. Accordingly, if personal computer 38 is coupled to fully queryable computer network 214 and user 46 wishes to initiate status request 66, upon message status determination process 10 processing status request 66, message status determination process 10 may be able to obtain more robust information concerning the devices included within fully queryable computer network 214. Accordingly and on such a fully queryable computer network (e.g., such as a corporate email system), wherein the network topology is owed by a corporate IT organization and all nodes/devices/routers/etc are positioned within the corporate firewall, the above-described robust information will be very accurate. For example, assume for illustrative purposes that each delivery node/agent within the above-described corporate email system (e.g., fully queryable computer network 214) may automatically update their current status. For example, if a delivery node is processing emails at the rate of 100 emails per second and there are less than 100 emails in the arrival queue, the anticipated processing delay associated with this delivery node is less than one second. However, if the arrival queue in this delivery node includes 10,000 email messages and the email being scrutinized is essentially at the end of this arrival queue, the anticipated processing delay for this delivery node is approximately 100 seconds. Accordingly, when this anticipated processing delay is added to the delay characteristics of the other nodes/agents (which are also automatically updating their status), the above-described robust information will be very accurate.

The information obtained concerning these devices and network conditions in general may be referred to as status indicators 72. Examples of status indicator 72 may include but are not limited to distance travelled; distance remaining; time elapsed; time remaining; hops completed; hops remaining; time initiated; estimated time of completion; failure indicators; and delay indicators.

The distance traveled status indicator may be indicative of the total distance (e.g. in miles) traveled thus far by electronic message 66 on its route from user 46 to user 52.

The distance remaining status indicator may be indicative of the total distance remaining (e.g. in miles) to be traveled by electronic message 66 on its route from user 46 to user 52.

The time elapsed status indicator may be indicative of the total time (e.g. in milliseconds) elapsed thus far as electronic message 66 travels from user 46 to user 52.

The time remaining status indicator may be indicative of the total time remaining (e.g. in milliseconds) as electronic message 66 travels from user 46 to user 52.

The hops completed status indicator may be indicative of the total hops completed thus far by electronic message 66 on its route from user 46 to user 52. As is known in the art, a "hop" is a term that refers to the passage of a piece of data through a device on a network. Accordingly, if an electronic message is composed on a first device, and it needs to pass through a first network server and a second network server prior to arriving at the intended destination of the electronic message, two hops would be required to effectuate this electronic message transmission.

The hops remaining status indicator may be indicative of the total hops remaining to be completed by electronic message 66 on its route from user 46 to user 52.

The time initiated status indicator may be indicative of the time that electronic message 66 was transmitted.

The estimated time of completion status indicator may be indicative of the anticipated time that electronic message 66 is expected to arrive at its destination (e.g. user 52). Typically, the estimated time of completion status indicator may be generated by summing a plurality of anticipated discrete delays.

Failure indicators may be indicative of one or more failure events that occurred within fully queryable computer network.

Delay indicators may be indicative of one or more delay events that occurred within fully queryable computer network.

Partially Queryable Computer Network:

An example of a partially queryable computer network (e.g., partially queryable computer network 216) may include but is not limited to a closed and/or open network that is either public or operated by an organization (e.g. company or an educational institution), wherein some of the network devices included within partially queryable computer network 216 are moderately accessible and/or partially controllable by third parties (e.g., administrators of message status determination process 10).

For example, one or more of the network devices included within partially queryable computer network 216 may include one or more probes (e.g. probe 218 and probe 220). As is known in the art, a probe may be a software application that is executed on a network device (e.g., computer 204, 206 respectively) that allows for the remote retrieval of information from that network device. For example, probe 218 and/or probe 220 may be configured to provide message status determination process 10 with one or more of the above-described status indicators. Accordingly, if personal computer 38 is coupled to partially queryable computer network 216 and user 46 wishes to initiate status request 66, upon message status determination process 10 processing status request 66, message status determination process 10 may be able to obtain (via e.g. probe 218 and/or probe 220) less robust information (when compared to fully queryable computer network 214) concerning the devices included within partially queryable computer network 216. This less robust information may be obtainable via the above-described status indicators.

Non-Queryable Computer Network:

An example of a non-queryable computer network (e.g., the network that computers 208, 210, 212 and notebook computer 44 are included in) may include but is not limited to a closed and/or open network that is either public or operated by an organization (e.g. a company or an educational institution), wherein most/all of the network devices included within non-queryable computer network are not accessible and/or not controllable by third parties (e.g., administrators of message status determination process 10).

For example, none of the network devices included within the non-queryable computer network are shown to include probes. Accordingly, message status determination process 10 may not be able to ascertain the above-described status indictors concerning the devices included within the non-queryable computer network.

While the above-described non-queryable computer network will typically not allow for the determination of the above-described status indicators, message status determination process 10 may utilize other procedures to acquire information that may assist in the generation of message status report 70. For example, message status determination process 10 may utilize a route trace procedure to obtain root trace information concerning the pathway between user 46 and user 52. Accordingly, this route trace procedure may identify network devices that are positioned along the pathway between user 46 and user 52 and determine a processing time (e.g. in milliseconds) for each of these devices. Accordingly, if you have five network devices having processing times of 10 ms, 20 ms, 40 ms, 30 ms, and 20 ms respectively, the anticipated delay for electronic message 68 traveling along this five network device pathway is the sum of 10 ms, 20 ms, 40 ms, 30 ms, and 20 ms, namely 120 ms.

Accordingly and as is readily apparent from the above discussion, as fully queryable computer network 214 allows for retrieval of the most robust information concerning network conditions, it may be desirable to utilize fully queryable computer network 214 as much as possible. Conversely, as the above-described, non-queryable computer network is the most difficult network for obtaining information concerning network conditions, it may be desirable to utilize the non-queryable computer network as little as possible. Further, as partially-queryable computer network 216 has an intermediate level of difficulty concerning obtaining information concerning network conditions, it may be desirable to avoid utilizing partially-queryable computer network 216 if fully queryable computer network 214 is available. However, it may be desirable to utilize partially queryable computer network 216 when the above-described non-queryable computer network is the only other option.

Further, fully queryable nodes that are adjacent to non-querable and/or partial queryable nodes may help with enhancing prediction accuracy. As discussed above, when messages pass from sender to recipient, this transfer may result in several hops across multiple devices. In corporate environments, it is typical for messages from a sender to a receiver to traverse the same path (or a minimal number of alternate paths). As is known in the art, paths are typically preconfigured/orchestrated in a corporate environment, For example, assume that Nodes A, B, C and Nodes E, F, G are within the above-described corporate network, and that Node E is outside of the corporate network (e.g. an ISP or a $3^{rd}$ party relay node). Accordingly, message status determination process 10 may be able to predict, with reasonable accuracy, the characteristics of Node D, as the corporate network has ownership of Node C and Node E. Therefore, message status determination process 10 may be configured to query the arrival and departure rate of Node C and Node E to estimate the anticipated processing delay of Node D, even though Node D is a non-querable and/or partial queryable node.

As discussed above, message status determination process 10 may predict 102 a probable route between the sender (e.g., user 46) and the recipient (e.g., user 52) for electronic message 68. When predicting 102 this probable route, message status determination process 10 may predict the most efficient pathway for electronic message 68 to travel long. For the reasons discussed above, fully queryable computer network 214 is more efficient than partially queryable computer network 216, and partially queryable computer network 216 is more efficient than the above-described non-queryable computer network.

As discussed above, one possible pathway for the transmission of electronic message 68 from user 46 to user 52 was referred to above as Path A and is as follows: computer 38→computer 200→computer 202→computer 204→computer 206→computer 208→computer 44. Specifically and excluding the origination and destination computers, Path A includes two computers within fully queryable computer network 214, two computers within partially queryable computer network 216, and only one computer within the above-described non-queryable computer network. Accordingly, message status determination process 10 may be able to obtain more robust information concerning computers 200, 202, less robust information concerning computers 204, 206 (from e.g. probes 218, 220) and little information concerning computer 208. As discussed above, message status determination process 10 may utilize a route trace procedure to obtain root trace information concerning computer 208.

Accordingly, the above-described probable route (i.e., Path A, namely computer 38→computer 200→computer 202→computer 204→computer 206→computer 208→computer 44) may pass through, in whole or in part, a fully queryable computer network (e.g., fully queryable computer network 214); a partially queryable computer network (e.g., partially queryable computer network 216); and the above-described non-queryable computer network.

As discussed above, message status determination process 10 may determine 104 a message status (as provided in message status report 70) for electronic message 68 from the above-described status indicators 72 based at least in part upon the above-mentioned probable route. Further and as discussed above, the above-described probable route (i.e., Path A) may pass through a plurality of different networks having differing information retrieval capabilities.

Accordingly, when determining 104 message status (as provided in message status report 70), message status determination process 10 may obtain 106 the above-described more robust information concerning the network devices (e.g., computers 200, 202) included within fully queryable computer network 214.

Additionally, when determining 104 message status (as provided in message status report 70), message status determination process 10 may obtain 108 the above-described less robust information concerning the network devices (e.g., computers 204, 206) included within partially queryable computer network 216.

Further, when determining 104 message status 70, message status determination process 10 may obtain 110 the above-described route trace information concerning the network devices (e.g., computer 208) included within the above-described non-queryable computer network.

Status indicators 70 may be generated based upon the combination of information obtained from all devices across all of the networks. Accordingly, message status determination process 10 may determine a delay for each device along a network pathway (e.g., Path A). Message status determination process 10 may then sum these delays, thus determining the total time for transmitting the message (e.g., electronic message 68). Message status determination process 10 may obtain one or more of the above-described status indicators (e.g., distance travelled; distance remaining; time elapsed; time remaining; hops completed; hops remaining; time initiated; estimated time of completion; failure indicators; and delay indicators) for the message (e.g., electronic message 68) and use these status indicators to compile message status report 70.

For example and as discussed above, the probable route for electronic message 68 is Path A (namely computer 38→computer 200→computer 202→computer 204→computer 206→computer 208→computer 44). Accordingly, when determining 104 the status of electronic message 68, message status determination process 10 may utilize a route trace procedure to obtain root trace information concerning the pathway between user 46 and user 52, which may identify network devices that are positioned along the pathway between user 46 and user 52 and determine a processing time (e.g. in milliseconds) for each of these devices. As discussed above, assume that the following processing times are determined: 10 ms (computer 200), 20 ms (computer 202), 40 ms (computer 204), 30 ms (computer 206), and 20 ms (computer 208). Accordingly, the anticipated delay for electronic message 68 traveling along this five network device pathway is the sum of 10 ms, 20 ms, 40 ms, 30 ms, and 20 ms (i.e., 120 ms). Further, assume that computers 200, 202 (which are in fully queryable computer network 214) report to message status determination process 10 that electronic message 56 has already passed through computers 200, 202. Further assume that computer 204 (via probe 218 within partially queryable computer network 216) reports that electronic message 56 has already passed through computer 204, while computer 206 (via probe 220 within partially queryable computer network 216) reports that electronic message 56 has not yet passed through computer 206. Accordingly, message status determination process 10 may determine 104 that electronic message 56 will arrive in 50 ms, the anticipated processing delays for computers 206, 208 (i.e., the only two computer that have not yet processed electronic message 56).

Once the above-described information (e.g. status indicators 72 and the route trace information) is obtained, message status determination process 10 may generate 112 message status report 70, which may be provided 112 to the requester (e.g. user 46), wherein message status report 70 may define the status of electronic message 68. For example, message status report 70 may provide any or all of the information provided via status indicators 72.

Such a system may be highly useful in the situation were a party is waiting for a particular email for arrive. For example, assume that the sender (e.g., user 46) and the recipient (e.g., user 52) are on a telephone call and are waiting for the arrival of electronic message 68. However, after a brief pause (maybe two minutes), they are each wondering where electronic message 68 is. Accordingly, user 46 or user 52 may use message status determination process 10 to determine the delivery status/location of electronic message 68.

In the event that electronic message 56 is addressed to multiple recipients, message status report 70 may be configured to show the status of electronic message 56 with respect to each of its intended recipients. For example, a message that is addressed to recipients that are both inside and outside of a corporate infrastructure may result in e.g., electronic message 56 being delivered to recipients within the corporate infrastructure much more quickly than electronic message 56 is delivered to recipients outside of the corporate infrastructure.

While the system as described above as being utilized for e-mail messages, this is for illustrative purposes only and is not intended to be a limitation of this disclosure as other configurations are possible. For example, status determination process 10 may be used to determine the delivery status of other types of electronic communications such as: SMS text messages, e-mail attachments, and transferred files.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
processing a status request received from a requester concerning an electronic message addressed from a sender to a recipient in response to a selection by the requester after transmitting the electronic message and prior to the recipient receiving the electronic message;
predicting a probable route between the sender and the recipient for the electronic message, wherein predicting the probable route is based upon, at least in part, a determination of a query-ability of a plurality of network devices along the probable route and a relative proximity of the plurality of network devices to each other, the probable route include at least a queryable node and one or more of a partial queryable node and a non-queryable node;
determining a message status for the electronic message from one or more status indicators based at least in part upon the probable route, including a processing rate of the queryable node, a current number of emails in a queue for the queryable node, an estimated anticipated processing delay of one or more of the partial queryable and the non-queryable node based upon, at least in part, an arrival and a departure rate of the queryable node adjacent the one or more partial queryable and non-queryable node, wherein at least a portion of the one or more status indicators are obtained by a probe for the one or more partial queryable node, and wherein at least a portion of the one or more status indicators are obtained by a route trace for the non-queryable node; and
providing the sender and the recipient with the message status concerning the electronic message, wherein the message status includes a predicted amount of time remaining until the electronic message reaches the recipient based upon, at least in part, a delay associated with each of a plurality of network devices along the probable route.

2. The computer-implemented method of claim 1 wherein the requestor is one of the sender and the recipient.

3. The computer-implemented method of claim 1 wherein the probable route passes through, in whole or in part, one or more of:
a fully queryable computer network;
a partially queryable computer network; and
a non-queryable computer network.

4. The computer-implemented method of claim 3 wherein determining a message status includes:
obtaining more robust information concerning one or more devices included within the fully queryable computer network.

5. The computer-implemented method of claim 3 wherein determining a message status includes:
obtaining less robust information concerning one or more devices included within the partially queryable computer network.

6. The computer-implemented method of claim 3 wherein determining a message status includes:

obtaining route trace information concerning one or more devices included within the non-queryable computer network.

7. The computer-implemented method of claim 1 wherein the one or more status indicators is chosen from a group consisting of:
distance travelled;
distance remaining;
time elapsed;
hops completed;
hops remaining;
time initiated;
estimated time of completion;
failure indicators; and
delay indicators.

8. A computer program product residing on a non-transitory computer readable medium having a plurality of instructions stored thereon which, when executed by a processor, cause the processor to perform operations comprising:
processing a status request received from a requester concerning an electronic message addressed from a sender to a recipient in response to a selection by the requester after transmitting the electronic message and prior to the recipient receiving the electronic message;
predicting a probable route between the sender and the recipient for the electronic message, wherein predicting the probable route is based upon, at least in part, a determination of a query-ability of a plurality of network devices along the probable route and a relative proximity of the plurality of network devices to each other, the probable route include at least a queryable node and one or more of a partial queryable node and a non-queryable node;
determining a message status for the electronic message from one or more status indicators based at least in part upon the probable route, including a processing rate of the queryable node, a current number of emails in a queue for the queryable node, an estimated anticipated processing delay of one or more of the partial queryable and the non-queryable node based upon, at least in part, an arrival and a departure rate of the queryable node adjacent the one or more partial queryable and non-queryable node, wherein at least a portion of the one or more status indicators are obtained by a probe for the one or more partial queryable node, and wherein at least a portion of the one or more status indicators are obtained by a route trace for the non-queryable node; and
providing the sender and the recipient with the message status concerning the electronic message, wherein the message status includes a predicted amount of time remaining until the electronic message reaches the recipient based upon, at least in part, a delay associated with each of a plurality of network devices along the probable route.

9. The computer program product of claim 8 wherein the requestor is one of the sender and the recipient.

10. The computer program product of claim 8 wherein probable route passes through, in whole or in part, one or more of:
a fully queryable computer network;
a partially queryable computer network; and
a non-queryable computer network.

11. The computer program product of claim 10 wherein the instruction for determining a message status include instruction for:

obtaining more robust information concerning one or more devices included within the fully queryable computer network.

12. The computer program product of claim 10 wherein the instruction for determining a message status include instruction for:
obtaining less robust information concerning one or more devices included within the partially queryable computer network.

13. The computer program product of claim 10 wherein the instruction for determining a message status include instruction for:
obtaining route trace information concerning one or more devices included within the non-queryable computer network.

14. The computer program product of claim 8 wherein the one or more status indicators is chosen from a group consisting of:
distance travelled;
distance remaining;
time elapsed;
hops completed;
hops remaining;
time initiated;
estimated time of completion;
failure indicators; and
delay indicators.

15. A computing system including a processor and memory configured to perform operations comprising:
processing a status request received from a requester concerning an electronic message addressed from a sender to a recipient in response to a selection by the requester after transmitting the electronic message and prior to the recipient receiving the electronic message;
predicting a probable route between the sender and the recipient for the electronic message, wherein predicting the probable route is based upon, at least in part, a determination of a query-ability of a plurality of network devices along the probable route and a relative proximity of the plurality of network devices to each other, the probable route include at least a queryable node and one or more of a partial queryable node and a non-queryable node;
determining a message status for the electronic message from one or more status indicators based at least in part upon the probable route, including a processing rate of the queryable node, a current number of emails in a queue for the queryable node, an estimated anticipated processing delay of one or more of the partial queryable and the non-queryable node based upon, at least in part, an arrival and a departure rate of the queryable node adjacent the one or more partial queryable and non-queryable wherein at least a portion of the one or more status indicators are obtained by a probe for the one or more partial queryable node, and wherein at least a portion of the one or more status indicators are obtained by a route trace for the non-queryable node; and
providing the sender and the recipient with the message status concerning the electronic message, wherein the message status includes a predicted amount of time remaining until the electronic message reaches the recipient based upon, at least in part, a delay associated with each of a plurality of network devices along the probable route.

16. The computing system of claim 15 wherein the requestor is one of the sender and the recipient.

17. The computing system of claim 15 wherein the probable route passes through, in whole or in part, one or more of:
a fully queryable computer network;
a partially queryable computer network; and
a non-queryable computer network.

18. The computing system of claim 17 wherein determining a message status includes:
obtaining more robust information concerning one or more devices included within the fully queryable computer network.

19. The computing system of claim 17 wherein determining a message status includes:
obtaining less robust information concerning one or more devices included within the partially queryable computer network.

20. The computing system of claim 17 wherein determining a message status includes:
obtaining route trace information concerning one or more devices included within the non-queryable computer network.

21. The computing system of claim 15 wherein the one or more status indicators is chosen from a group consisting of:
distance travelled;
distance remaining;
time elapsed;
hops completed;
hops remaining;
time initiated;
estimated time of completion;
failure indicators; and
delay indicators.

\* \* \* \* \*